(12) United States Patent
Christiansson et al.

(10) Patent No.: US 8,686,974 B2
(45) Date of Patent: Apr. 1, 2014

(54) TOUCH-SENSITIVE SYSTEM AND METHOD FOR CONTROLLING THE OPERATION THEREOF

(75) Inventors: Tomas Christiansson, Torna-Hällestad (SE); Ola Wassvik, Brösarp (SE)

(73) Assignee: Flatfrog Laboratories AB, Lund (SE)

( * ) Notice: Subject to any disclaimer, the term of this patent is extended or adjusted under 35 U.S.C. 154(b) by 176 days.

(21) Appl. No.: 13/393,762

(22) PCT Filed: Sep. 1, 2010

(86) PCT No.: PCT/SE2010/050933
§ 371 (c)(1),
(2), (4) Date: Mar. 1, 2012

(87) PCT Pub. No.: WO2011/028170
PCT Pub. Date: Mar. 10, 2011

(65) Prior Publication Data
US 2012/0162142 A1  Jun. 28, 2012

Related U.S. Application Data

(60) Provisional application No. 61/272,215, filed on Sep. 2, 2009.

(30) Foreign Application Priority Data

Sep. 2, 2009 (SE) ........................................ 0901145

(51) Int. Cl.
*G06F 3/042* (2006.01)
(52) U.S. Cl.
USPC ......... 345/175; 345/173; 178/18.09; 250/221
(58) Field of Classification Search
USPC .................. 345/175, 173, 174, 176, 179; 178/18.01, 18.09, 18.11; 250/221
See application file for complete search history.

(56) References Cited

U.S. PATENT DOCUMENTS 5,105,186 A * 4/1992 May .............................. 345/175
6,208,330 B1 3/2001 Hasegawa et al.
(Continued)

FOREIGN PATENT DOCUMENTS

WO  WO 2005/026938  3/2005
WO  WO 2006/006174  1/2006
(Continued)

OTHER PUBLICATIONS

Extended European Search Report issued in European Application No. 10814031.0, dated Dec. 12, 2013.

*Primary Examiner* — Joe H Cheng
(74) *Attorney, Agent, or Firm* — Harness, Dickey & Pierce, P.L.C.

(57) ABSTRACT

A touch-sensitive system comprises a light transmissive panel defining a touch surface and an opposite surface; an illumination arrangement comprising emitters configured to introduce light into the panel for propagation in the panel in an emission pattern; a light detection arrangement comprising detectors configured to receive the light propagating in the panel. A control unit is arranged to control the operation of the touch-sensitive system. The control unit executes a control method to monitor the light received in the light detecting arrangement for detection of touches on the touch surface, the touches attenuating the light propagating in the panel. The control method also selects a mode for the emission pattern in dependence of the occurrence of touches on the touch surface and controls the emission pattern in accordance with the selected mode.

20 Claims, 7 Drawing Sheets

(56) References Cited

U.S. PATENT DOCUMENTS

| | | | |
|---|---|---|---|
| 6,784,948 B2* | 8/2004 | Kawashima et al. | 349/12 |
| 7,465,914 B2* | 12/2008 | Eliasson et al. | 250/221 |
| 7,995,039 B2* | 8/2011 | Eliasson et al. | 345/173 |
| 8,350,827 B2* | 1/2013 | Chung et al. | 345/175 |
| 2003/0034439 A1* | 2/2003 | Reime et al. | 250/221 |
| 2008/0029691 A1 | 2/2008 | Han | |
| 2008/0062150 A1 | 3/2008 | Lee | |
| 2008/0122803 A1 | 5/2008 | Izadi et al. | |
| 2009/0267919 A1* | 10/2009 | Chao et al. | 345/175 |
| 2009/0273794 A1* | 11/2009 | Ostergaard et al. | 356/614 |
| 2011/0069039 A1* | 3/2011 | Lee et al. | 345/176 |
| 2011/0227874 A1* | 9/2011 | Fahraeus et al. | 345/175 |
| 2012/0162144 A1* | 6/2012 | Fahraeus et al. | 345/178 |
| 2012/0169672 A1* | 7/2012 | Christiansson | 345/175 |
| 2012/0200538 A1* | 8/2012 | Christiansson et al. | 345/175 |

FOREIGN PATENT DOCUMENTS

| | | |
|---|---|---|
| WO | WO 2006/095320 | 9/2006 |
| WO | WO 2007/112742 | 10/2007 |
| WO | WO 2008/157237 | 12/2008 |
| WO | WO 2009/077962 | 6/2009 |
| WO | WO 2010/064983 | 6/2010 |

* cited by examiner

TOUCH-SENSITIVE SYSTEM AND METHOD FOR CONTROLLING THE OPERATION THEREOF

CROSS-REFERENCE TO RELATED APPLICATIONS

The present application claims the benefit of Swedish patent application No. 0901145-3, filed on Sep. 2, 2009, and U.S. provisional application No. 61/272,215, filed on Sep. 2, 2009, both of which are incorporated herein by reference.

FIELD OF THE INVENTION

The present invention relates to touch-sensitive systems, and methods for operation control in relation to such systems.

BACKGROUND OF THE INVENTION

Touch-sensitive panels are increasingly being used for providing input to computers, electronic measurements and test equipment, gaming devices etc. The panel may be provided with a graphical user interface (GUI) for a user to interact with using e.g. a pointer, stylus or one or more fingers.

To be able to provide touch sensitivity to the panel, cameras may be used to capture light scattered off the point(s) of touch on the panel, or by incorporation of resistive wire grids, capacitive sensors, strain gauges etc. into the panel. The panel may provide interaction capabilities for numerous simultaneous touches.

WO2006/095320 discloses a system that emits and detects light above a panel surface. When a user touches the surface, optical transmissions between in- and outgoing coupling points are blocked and the system detects the presence or absence of light between these points. An energy saving function is disclosed to be run when the system is not in use. If the display screen is contaminated by e.g. fingerprints, the optical transmission path may become unintentionally interrupted and the information retrieved from the system erroneous or incomplete as the contaminated surface becomes insensitive to touches. There is also no guarantee that the whole surface can be covered by optical transmission, as the above surface enablement may require a bezel around the panel. If contaminants are collected in front of one of the emitters or detectors there will always be blocked light paths. Systems that has a bezel around the panel surface are very prone to collecting dust, grease, etc at the bezel position. Placing emitters and detectors at the bezel position is therefore not desired, and it may thus be hard to illuminate the whole surface.

Another touch screen with illumination above a touch surface is disclosed in US2008/0062150. The touch screen implements an energy saving function which reduces the scan speed, i.e. frequency of sequentially activating light sources to emit light across the touch surface, if the touch screen has not been touched for a predetermined time period.

WO2009/077962 discloses a touch screen in the form of a panel using a tomograph including signal flow ports. The tomograph processes signals introduced in the panel and detects changes in the signals caused by touches. The touch sensitive technique can be based on frustrated total internal reflection (FTIR), which means that light is injected into the panel from its borders and propagates through the panel. The algorithms used are not specially adapted to detect changes in an FTIR system. For example, the disclosed tomograph uses detection of transmitted light, but determines the locations of touches based on signals obtained by subtracting a background signal from the detected signals. Nevertheless, an FTIR system has the potential of being less sensitive to contaminants such as fingerprints and grease on the panel, as the contaminants only absorb a fraction of the light along a path through the panel. An FTIR system may thus enable a reliable and robust interaction with users. The inventors have now realized that there is a need for an energy saving function that is specially adapted to the FTIR technology.

Thus, the objective of the present invention is thus to reduce the energy consumption of a touch-sensitive system based on FTIR technology, and in particular reduce the energy consumption when the touch-sensitive system is in use.

SUMMARY

This and other objects, which may appear from the description below, are at least partly achieved by means of a touch-sensitive system, a method and a computer readable medium according to the independent claims, embodiments thereof being defined by the dependent claims.

One aspect of the invention is a touch-sensitive system comprising: a light transmissive panel defining a touch surface and an opposite surface; an illumination arrangement comprising emitters configured to introduce light into the panel for propagation in the panel in an emission pattern; a light detection arrangement comprising detectors configured to receive the light propagating in the panel; the system further comprises a control unit for controlling the illumination arrangement, the control unit further comprises a mode selector configured to monitor the light received in the light detection arrangement to detect one or more touches on the touch surface, said one or more touches attenuating the light propagating in the panel; and select a mode for the emission pattern in dependence of the occurrence of touches on the touch surface; whereby the control unit is configured to control the emission pattern in accordance with the selected mode, and wherein the control unit is configured to control the emission pattern by changing at least one of the number of active emitters in the illumination arrangement and the intensity of the light emitted by the emitters.

According to this aspect, the mode selector may thus be adapted for saving energy in touch-sensitive systems with in- and out-coupling points along the sides of the panel. One advantage of this aspect is the ability to change the emission pattern to reduce the energy consumption of the touch-sensitive system, and/or to enable a higher updating frequency (frame rate) of the touch-sensitive system for a given energy consumption. The change in emission pattern may also be used to achieve different resolutions on different parts of the touch surface, e.g. the resolution can be selectively increased on part of the touch surface that has many touches.

Embodiments of the invention are designed to allow for reduced energy consumption during both inactive (no touches on the touch surface) and active use of the touch-sensitive system.

Embodiments of the invention are designed to provide for a dynamic adaptation of the energy consumption to the actual activity on the touch surface.

Embodiments of the invention are designed to provide a fast response for new touches on the touch surface.

Another aspect of the invention is a method for operating a touch-sensitive system comprising a light transmissive panel defining a touch surface and an opposite surface, the method comprises:

introducing light into the panel with an illumination arrangement comprising emitters, for propagating in the panel in an emission pattern;

receiving the light propagating on the panel with a light detection arrangement comprising detectors;

monitoring the light received by the light detection arrangement to detect one or more touches on the touch surface, said one or more touches attenuating the light propagating in the panel;

selecting a mode for the emission pattern in dependence of the occurrence of touches on the touch surface; and controlling the emission pattern in accordance with the selected mode, wherein the emission pattern is controlled by changing at least one of the number of active emitters in the illumination arrangement and the intensity of the light emitted by the emitters.

Yet another aspect of the invention is a computer-readable medium storing processing instructions that, when executed by a data processor, performs the above-identified method.

Further embodiments of the invention are set forth in the dependent claims, the detailed description and in the drawings.

SHORT DESCRIPTION OF THE APPENDED DRAWINGS

Below embodiments of the invention will be described with reference to the accompanying drawings, in which.

DETAILED DESCRIPTION OF EXEMPLARY EMBODIMENTS OF THE INVENTION

Throughout the description, the same reference numerals are used to identify corresponding elements/steps.

Figure 1:
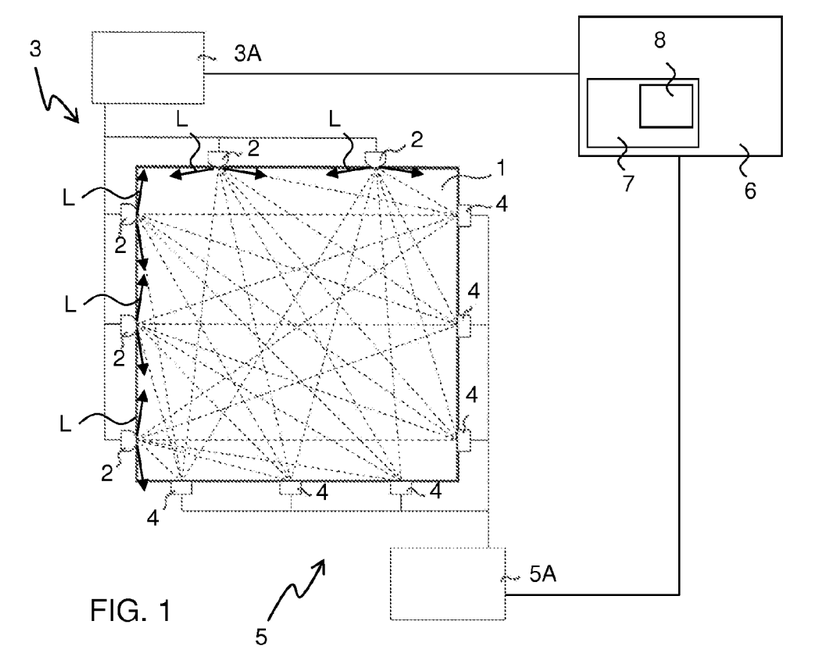
FIG. 1 is top plan view of a touch-sensitive system according to one embodiment.

An example of a touch-sensitive system is shown in FIG. 1, comprising a panel 1, an illumination arrangement 3 comprising emitters 2 and an illumination control unit 3A, and a light detection arrangement 5 comprising detectors 4 and a detection control unit 5A. The touch-sensitive system is according to one embodiment a multi-touch system, thus enabling detection of a multiplicity of touches. The emitters 2 introduce light L into the panel at in-coupling points, an in-coupling point defining a point on the panel 1 where light L from an emitter 2 enters the panel 1. The detectors 4 detects the energy of the light at out-coupling points, an out-coupling point defining a point on the panel where the light propagating in the panel 1 leaves the panel 1 for subsequent detection by a detector 4. It is only the in-coupling and out-coupling points of the detectors 4 and emitters 2, respectively, that have to be arranged along the periphery of the panel; the detectors 4 and emitters 2 may be arranged at a distance from the panel 1. Light may enter and leave the panel 1 through the edges of the panel 1, or through the top or bottom surface of the panel, e.g. by the use of an appropriate light coupling element. The number and placement of the emitters 2 and detectors 4 (and thus also the in- and out-coupling points) in the Figures are for illustrative purpose only, and it is understood that the number and placement of the emitters 2 and detectors 4 (and also the in- and out-coupling points) may be different from what is shown in the Figures. For example, the emitters 2 and detectors 4 do not have to be grouped as shown in FIG. 1, but may instead be arranged in a mixed order. The emitters 2 may be arranged in arrays to inject a number of diverging beams into the panel 1, and the detectors 4 may be arranged in arrays to detect the transmitted light energy. A scanline (illustrated by dotted lines in FIG. 1) is the light path between one in-coupling and one out-coupling point, and an emitter 2 and a detector 4 at ends of a scanline are referred to as an emitter-detector pair. It is to be noted that a single emitter 2 may define more than one scanline, if the light from the emitter is injected as a diverging beam, i.e. a beam that expands in the plane of the panel 1. Likewise, a single detector 4 may define more than one scanline, if the detector is configured to detect light over a broad range of angles. Such an embodiment is illustrated in FIG. 1. In alternative embodiments, not shown, at least some light may be injected as one or more non-expanding beams, and/or one or more detectors may be configured with a narrow field of view.

In the different embodiments of the touch-sensitive system, the detectors may be 0, 1 or 2 dimensional photodetectors, such as photodiodes, CCD or CMOS arrays, etc, and the emitters may be LEDs, laser diodes, lamps, lasers, etc.

The panel 1 may have different kinds of geometrical shapes, and may be deflected i.e. not flat. The touch surface is not in any way limited to the rectangular shape illustrated in the Figures.

Although not shown in the Figures, the system may include an interface device that provides a Graphical User Interface (GUI) within at least part of the panel surface. The interface device may be a substrate with a fixed image arranged over, under or within the panel 1. Alternative, the interface device may be a screen (LCD, OLED, plasma display, etc) beneath the panel 1, or a projector arranged to project an image onto the panel 1, forming a dynamic GUI similar to the GUI on a computer screen.

Figure 2:
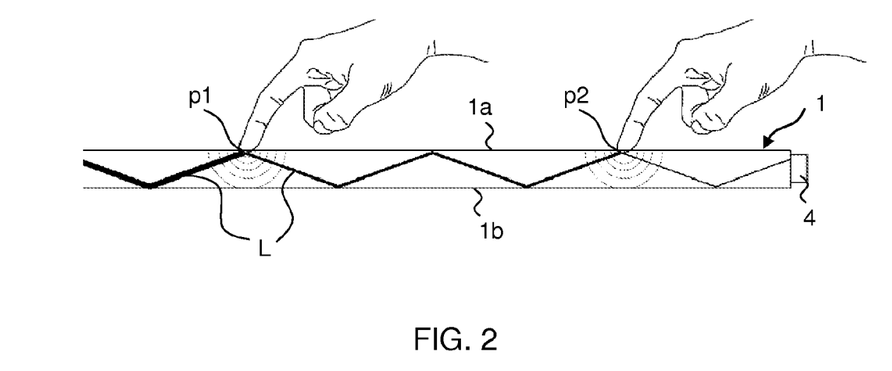
FIG. 2 is a side view of a light transmissive panel to illustrate how propagating light is attenuated by touching objects.

The light L from the emitter 2 is injected into the light transmissive panel 1 and propagates inside the panel 1 while being reflected in the top and bottom surfaces 1a, 1b, as shown in FIG. 2. Light may be reflected by total internal reflection, TIR, at least in the top surface 1a which forms a touch surface. The bottom surface 1b may reflect the light by TIR, or by a reflective coating (not shown) applied to the bottom surface 1b. At some other end of the panel 1, the energy of the transmitted light is detected by the detector 4. In the event of an object touching the touch surface of the panel 1, the object interacts with the light beam inside the panel 1 and frustrates the TIR. Frustrated total internal reflection (FTIR), in which energy is dissipated into the object from an evanescent wave formed by the propagating light, provided that the object has a higher refractive index than the material surrounding the panel surface material and is placed within less than several wavelengths distance from the surface, may be used in the present invention. During the frustration of TIR, part of the light beam will be absorbed by the object, and another part will be reflected and/or scattered by the object. The remaining light beam will continue with total internal reflection as before but now attenuated due to the absorption, reflection and scattering, as illustrated in FIG. 2 with a slightly thinner line.

The system detects touches on the touch surface by analyzing the ensemble of energy values determined for different detected scanlines. As will be explained further below, the occurrence of one or more touches may be determined by identifying changes in the ensemble of energy values. To determine the position of a plurality of touches of the touch surface, it may be advantageous to convert the energy values for the scanlines into transmission values.

Each detector 4 measures the energy of the transmitted light for a particular scanline $S_i$, here denoted $d_{ti}$, and the energy value $d_{ti}$ is compared with a background value for the scanline, $d_{bi}$. The transmission for scanline $S_i$ may be computed as, $T_i=d_{ti}/d_{bi}$. In a variant, the transmission may be computed as a difference value, $T_i=d_{ti}-d_{bi}$. Such a difference value may e.g. be used to quickly derive approximate touch data from the measured energy values (e.g. in the touch identification step 502 or the touch analysis step 506, to be described further below).

The background value can be obtained in several different ways; the simplest example is to calibrate the system at start up (or in a factory during production), i.e. by setting the background value $d_{bi}$ equal to the energy measured by for scanline $S_i$ when no objects are touching the touch surface.

As illustrated in FIG. 2, the transmitted light may carry information about a plurality of touches. In an FTIR system, each touch point $p_n$ (corresponding to a touching object) has a transmission $\tau_n$, which generally is in the range 0-1, but normally in the range 0.7-0.99. The total transmission $T_i$ along a scanline $S_i$ is at least approximately given by the product of the individual transmissions $\tau_n$ of the touch points $p_n$ on that scanline:

$$T_i = \Pi \tau_n \quad (1)$$

For example, two touch points $p_1$ and $p_2$ with transmissions 0.9 and 0.8, respectively, on a scanline $S_i$, yields a total transmission $T_i=0.72$. The second touch point $p_2$ will attenuate a part of the light L that reaches the second touch point, hence the multiplication. The difference between an above-surface setup as described in the Background section and an FTIR setup is that the transmission of every touch point is 0 in the above-surface setup, since the touch point blocks all light. The multiplicativity is thus not present in these setups. With an FTIR setup it is thus possible to "see through" touches on the panel 1.

The panel 1 may be made of any material that transmits a sufficient amount of light in the relevant wavelength range to permit sensible measurement of transmitted energy. Such materials includes glass, poly(methyl methacrylate) (PMMA) and polycarbonates (PC).

With reference to FIG. 1, the touch-sensitive system further comprises a control unit 6 configured to control the emission of the light L propagating in the panel 1. According to one embodiment, the control unit 6 is configured to control the emission pattern by selectively activating the emitters, e.g. by to change the number of active emitters 2. By changing the number of active emitters 2, it is made possible to tailor the number of emitters 2 according to the activity on the touch surface. If no touches are present, several emitters can be switched off to reduce the energy consumption of the system. The control unit 6 may also be configured to control the emission pattern of the light by changing the energy/intensity of the emitted light from the individual emitters 2. Reducing the light intensity when full intensity is not needed, e.g. when no touches are present on the touch surface, is another way to reduce the energy consumption of the system. It must still be ensured that the system achieves a good enough signal-to-noise ratio for detecting new touches. A reduced number of active emitters 2 in combination with a decreased light intensity is another embodiment according to the present invention that may be advantageous in order to reduce the energy consumption.

In the example of FIG. 1, the control unit 6 is operable to control the emission pattern via the illumination control unit 3A, which is operable to selectively control the supply of power to the emitters 2. In FIG. 1, the control unit 6 is also operable to collect data from the detectors 4 via the detection control unit 5A, which is operable to read data from the detectors 4. In alternative embodiments, the control unit 6 may be directly connected to the emitters 2 and/or detectors 4.

According to one embodiment, the control unit 6 is configured to control the frame rate. The frame rate is defined as the frequency by which data from all relevant detectors 4 and emitters 2 are collected and touch coordinates are computed. Thus, each frame begins by an activation of all emitters, or a subset thereof, and ends by an evaluation of the recorded energy for each relevant scanline. Each frame thus results in touch data, e.g. touch coordinates that are indicative of the position of each touch on the touch surface. If no touch is present on the touch surface, the touch data is represented by an empty data set. By changing the frame rate, the energy consumption of a processor 8 in the control unit 6 processing the data can be reduced and energy consumption may thus be reduced.

In one embodiment, the different emitters 2 are activated in sequence within a frame, such that each individual emitter is activated separately, whereby the transmitted light energy can be measured at each detector that receives light from the activated emitter. Thereby, an energy value is measured for each scanline during the frame.

In an alternative embodiment, groups of emitters 2 are activated concurrently, wherein each emitter is controlled to transmit a code by way of the emitted light such that the code identifies the respective emitter. Based on the transmitted codes, the energy measured by each detector 4 in the light detection arrangement 5 can be separated into energy values for each scanline. Such an emitter activation scheme is denoted "multiplexing" and is further described in PCT publication WO2010/064983, which is assigned to the present Applicant and incorporated herein by reference.

The system also comprises a mode selector 7 configured to monitor the light received in the light detecting arrangement 5 to detect touches on the touch surface that attenuate the light propagating in the panel 1. The mode selector 7 selects a mode for the emission pattern in dependence of the occurrence of touches on the touch surface, whereby the control unit 6 is configured to control the emission pattern in accordance with the selected mode. The selected mode then defines which and how many emitters that are to be activated, the intensity of the light and/or the frame rate.

Figure 3:
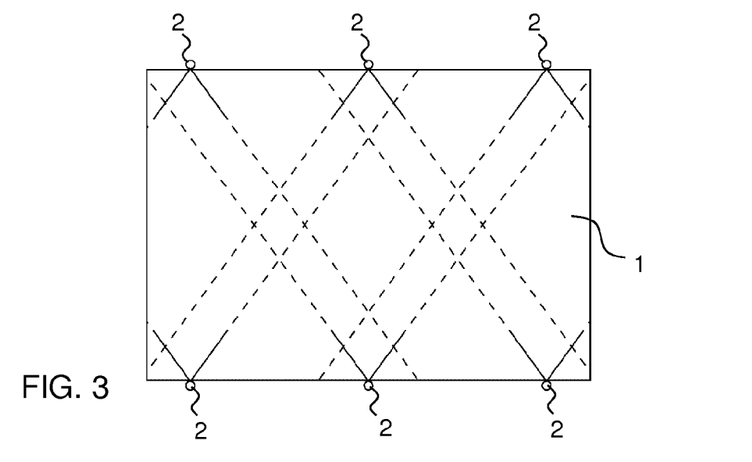
FIG. 3 illustrates six chosen emitters at opposing sides that emit light in a touch-sensitive system according to one embodiment of the invention.
Figure 4:
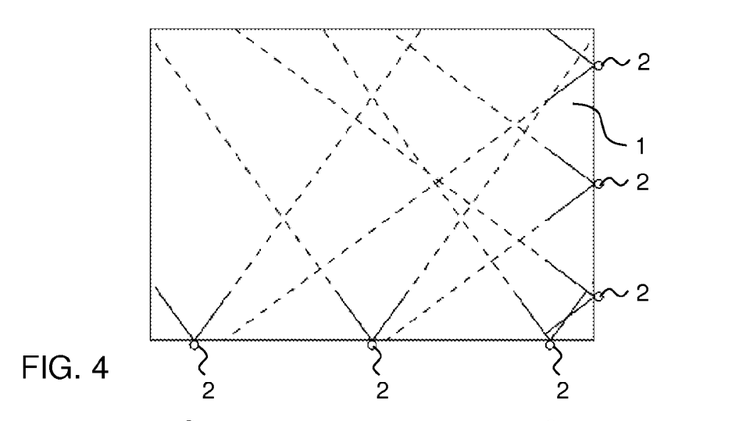
FIG. 4 illustrates six chosen emitters at adjacent sides that emit light in a touch-sensitive system according to one embodiment of the invention.

According to one embodiment, the control unit 6 activates only a subset of the available emitters 2 at the start of each frame. In the following disclosure, this subset is denoted "first subset". Then, depending on the selected mode, further emitters may be activated. Examples of a first subset of active emitters are shown in the plan views of FIGS. 3 and 4, where six selected emitters from opposing and adjacent sides, respectively, are activated to inject diverging beams of light (indicated by dashed lines) into the panel 1. It should be emphasized that only activated emitters are shown in FIGS. 3 and 4, while non-activated emitters are omitted. The examples are only illustrative, and other first subsets with a limited set of active emitters are of course possible to cover (i.e. illuminate) the surface of the panel 1. Advantageously the first subset is chosen to cover the complete touch surface with at least one scanline. The mode selector 7 then monitors the detected energy on the set of scanlines associated with the first subset of emitters. The mode selector 7 may look for changes in the transmission values $T_i$ or directly at the raw data value $d_{ti}$.

In the following, different embodiments of a method for controlling the emission pattern will be described in relation to flowcharts in FIGS. 5-8, in which the different steps are executed under the control of the control unit 6 (FIG. 1). Each flowchart illustrates steps executed during a single frame in a sequence of frames. Thus, the respective steps shown in of FIGS. 5-8 are repeated continually during operation of the touch-sensitive system, as indicated by dotted arrows.

Figure 5:
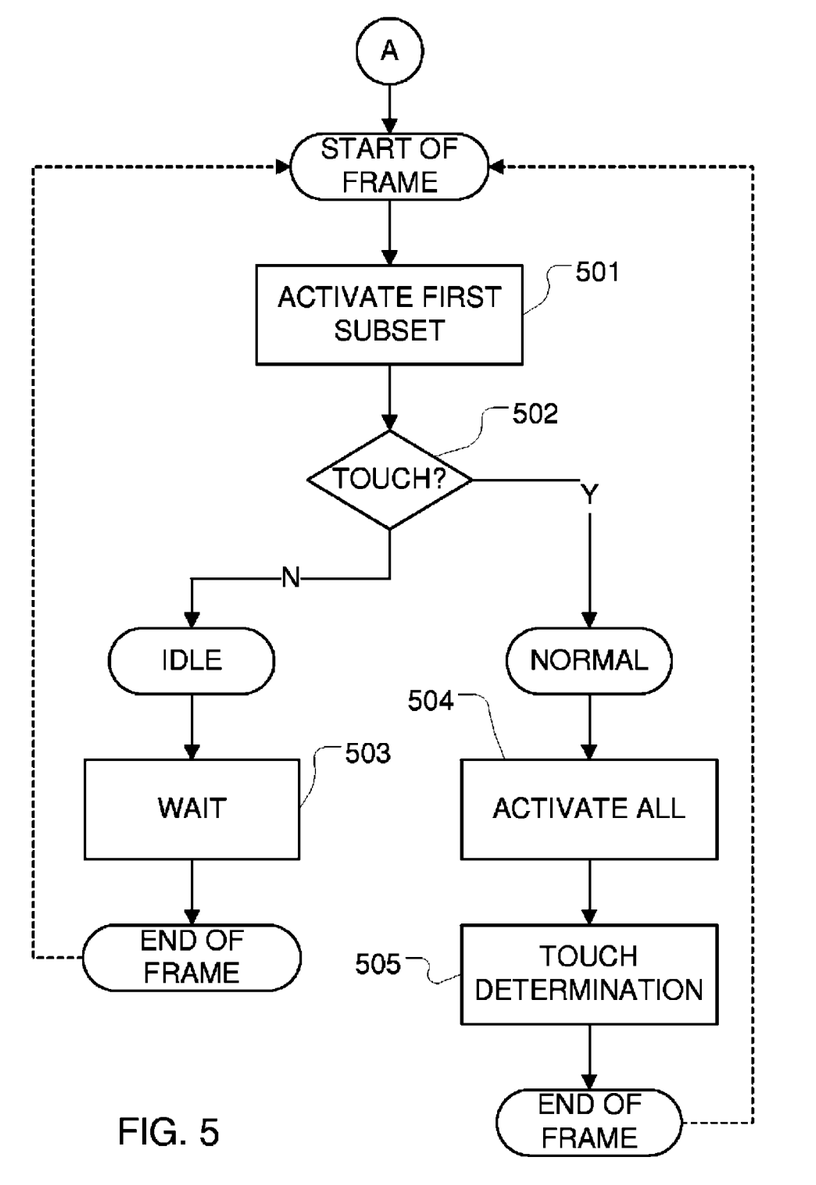
FIG. 5-8 are flowcharts of embodiments of the invention.

FIG. 5 is a flowchart of one embodiment of the invention, in which the mode selector 7 (FIG. 1) is operable to switch the system between an idle mode and a normal mode. In this, as well as other embodiments of the invention, a first subset of emitters are first activated to illuminate the interior of the panel (step 501). As explained above, the first subset results in a first ensemble of energy values $d_{ti}$ for different detected scanlines $S_i$. In a subsequent touch identification (step 502), the first ensemble of energy values $d_{ti}$, or transmission values $T_i$ if computed, is analyzed for identifying the presence of any touching objects. If a touching object is indicated and the system is in idle mode, the system enters normal mode, optionally after a delay period (see below); if already in normal mode, the system remains in normal mode. If no touching object is indicated and the system is in normal mode, the system enters idle mode; if already in idle mode, the system remains in idle mode. In the idle mode, no further emitters are activated, and the system waits for a given dwelling period (step 503) before starting the next frame. The length of the dwelling period is given by the desired frame rate of the system, which in turn determines the desired response time for detecting the occurrence of touches while the system is in idle mode. It is conceivable that the dwelling period is increased, continuously or in predetermined steps, over time while the system remains in the idle mode. In the normal mode, the system is controlled to activate all emitters (step 504). This can be done by activating those emitters not included in the first subset (i.e. the "rest" of the emitters), collecting a second ensemble of energy values for the resulting scanlines from the detectors, and combining the first and second ensembles to form a complete ensemble of energy values for all scanlines. Alternatively, all emitters are re-activated, and the complete ensemble of energy values is collected from the detectors. Following the activation step 504, the location of touching objects is determined based on the complete ensemble of energy values, or transmission values if computed (step 505).

Figure 6:
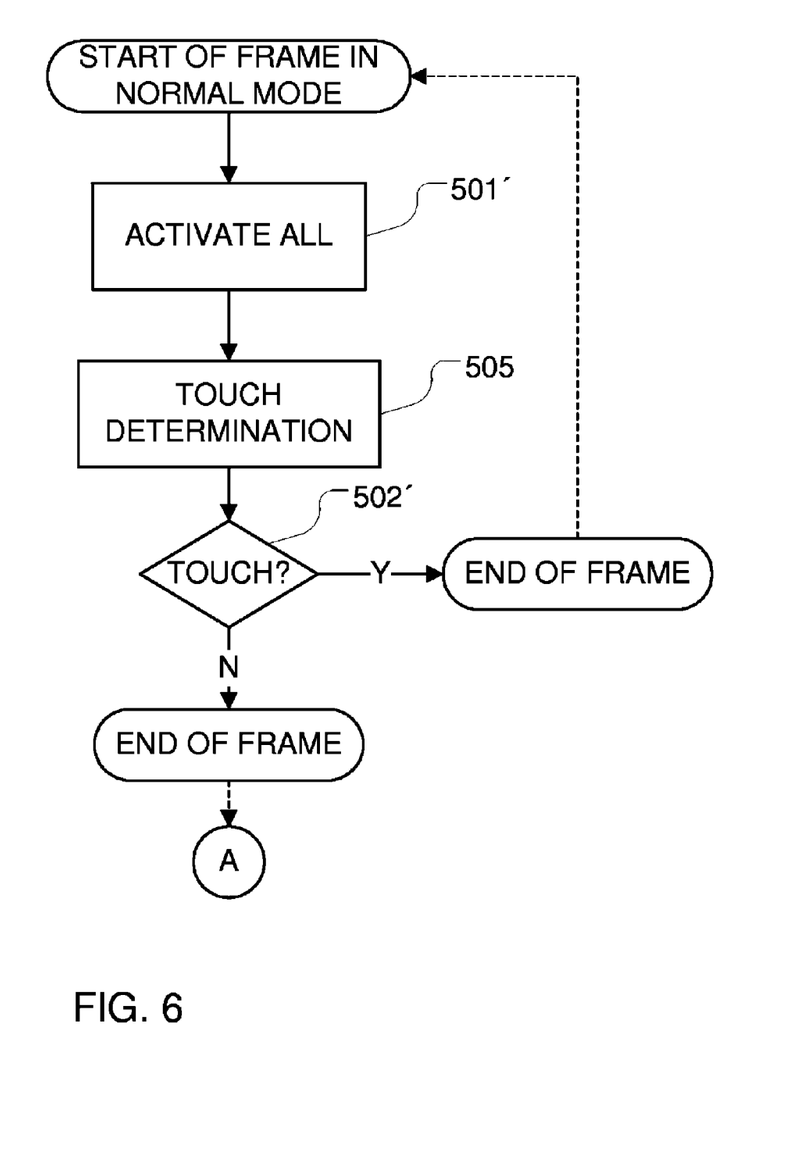

In a variant of the embodiment in FIG. 5, the system is configured to continuously "loop" inside the normal mode, frame by frame, as long as the touch determination step 505 results in touch coordinates. FIG. 6 is a flowchart for the normal mode in such an embodiment. As shown, the system activates all emitters at the start of each frame (step 501), instead of activating only the first subset. Thus, in step 501', the complete ensemble of energy values are collected from the detectors. In step 505, the location of touching objects is then determined based on the complete ensemble of energy values, or transmission values if computed. Whenever the system fails to determine locations in step 505, this is taken as an indication that no object is touching the touch surface (step 502'), and the system returns to the sequence of steps shown in FIG. 5, i.e. by activating the first subset at the start of the next frame. If one or more touch locations are determined in step 505', the next frame is started in the normal mode, by execution of step 501'.

Figure 7:
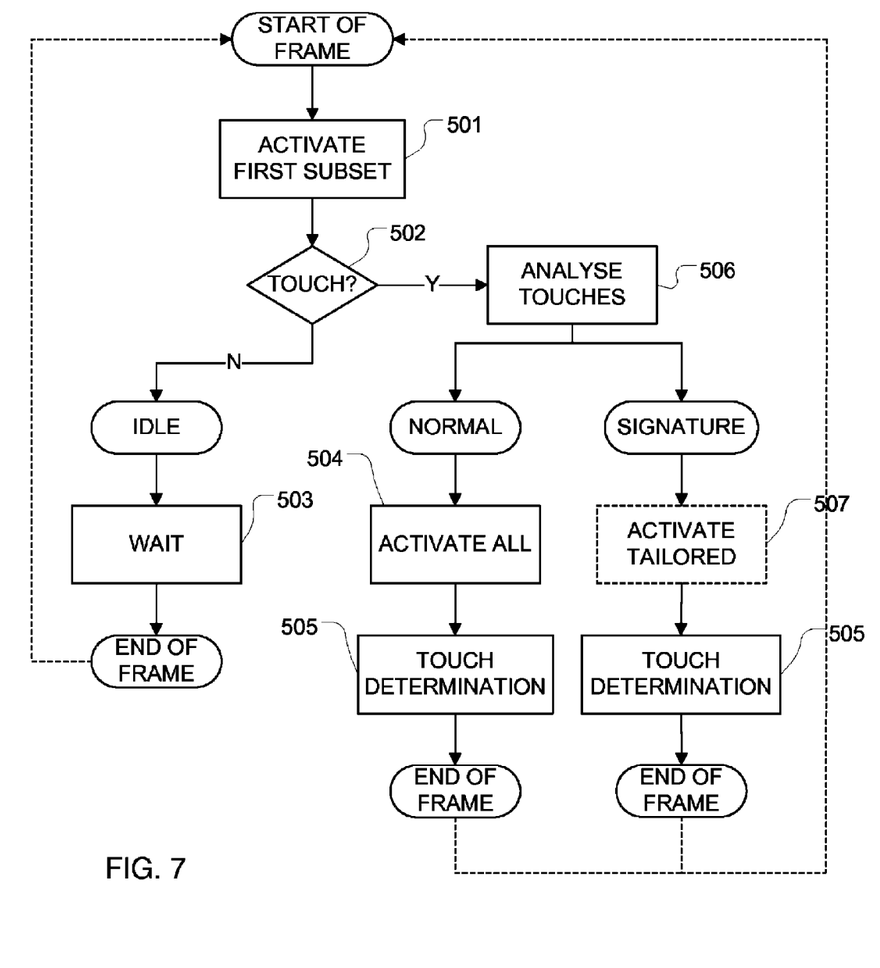

FIG. 7 is a flowchart of another embodiment. Compared to the embodiment in FIG. 5, the system may enter a signature mode, in addition to the idle and normal modes. In this embodiment, the signature mode is entered whenever a single touching object is identified on the touch surface. If more than one touching object is identified, the system is caused to enter normal mode, to operate as described above in relation to FIG. 5 or 6. To this end, the control method comprises a touch analysis step 506, in which the system discriminates between the provision of a single touching object and plural touching objects on the touch surface. Typically, step 506 involves a rudimentary (low resolution and low accuracy) touch determination step. It is to be understood that the embodiment shown in FIG. 7 presumes that the first ensemble of energy values (obtained from the first subset of emitters in step 501) contains sufficient information to allow step 506 to identify the number of touches, or at least to discriminate between one and plural touches. In a variant, step 506 is preceded by a further activation step (not shown), in which a second subset of emitters is activated to supplement the information from the first subset of emitters, to facilitate/enable the discrimination in step 506.

In signature mode, the system is suitably controlled to only collect as many energy values as needed to obtain sufficiently accurate information about a single touching object. Depending on implementation, the ensemble of energy values resulting from the first subset of emitters, and the optional second subset of emitters, may be sufficient for this purpose. As indicated in FIG. 7, the signature mode may also involve a touch determination step 505, in which the ensemble of energy values is processed for determination of touch locations. In a variant, not shown, the touch determination step 505 is omitted, and instead the touch location(s) determined by the rudimentary touch determination in step 506 is(are) output. As further indicated in FIG. 7, the signature mode may optionally involve a step of activating a further subset of emitters to enable collection of sufficient information (step 507). The supplementary activation step 507 may involve activating a geometrically tailored subset (to be described below).

Generally, the signature mode involves activating a limited set of emitters. This saves both computation time and the time needed to collect the energy values for the relevant scanlines from the detectors. The system may be controlled to maintain the same frame rate in the signature mode as in the normal mode. In one variant, the frame rate is increased in the signature mode compared to the normal mode, e.g. to enable a higher temporal resolution of the system, which might be desirable when the touching object is rapidly swept across the touch surface, e.g. when the user enters a scrolling gesture or handwriting gesture on the touch surface.

Figure 8:
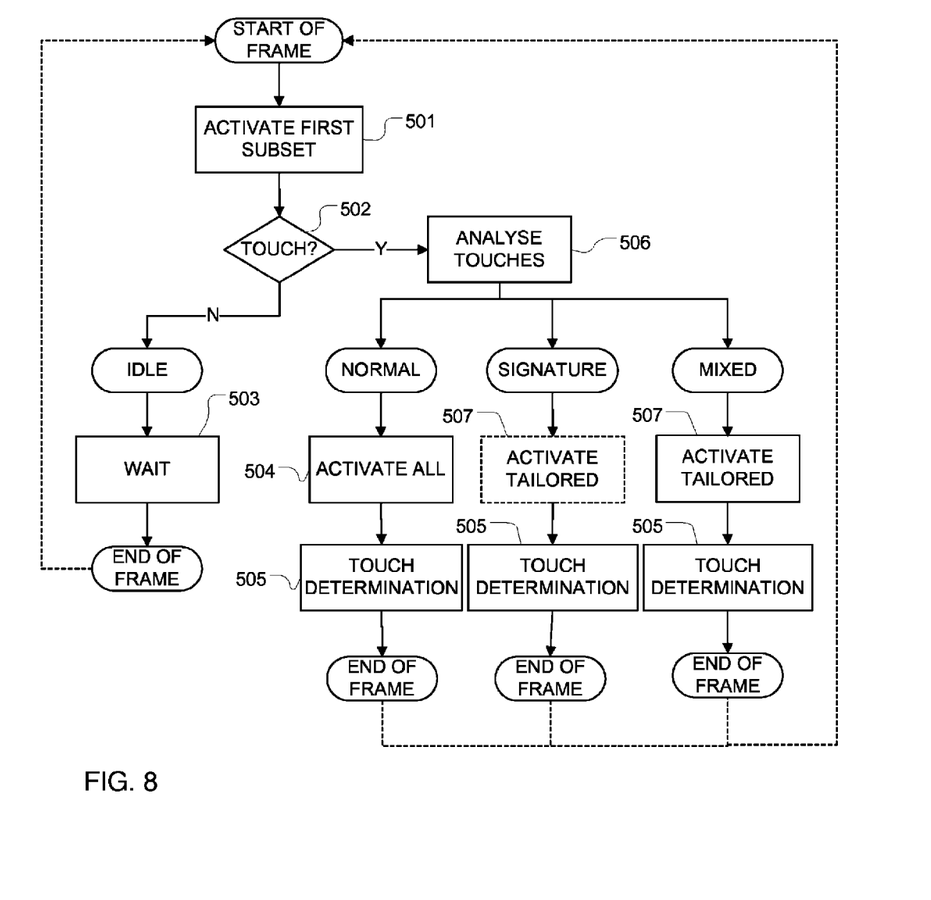

FIG. 8 is a flowchart of yet another embodiment. Compared to the embodiment in FIG. 7, the system may enter a mixed mode, in addition to the idle, normal and signature modes. In this embodiment, the mixed mode is entered whenever the number of touching objects falls within a given range (2-M), with M typically being 4-8. If more than M touching objects are identified, the system is caused to enter normal mode, and if a single touching object is identified, the system is caused to enter the signature mode, as described above in relation to FIG. 7. In the embodiment of FIG. 8, the touch analysis step 506 is configured to identify the number of touches, and to select mode accordingly. Typically, step 506 involves a rudimentary (low resolution and low accuracy)

touch determination. It is to be understood that the embodiment shown in FIG. 8 presumes that the ensemble of energy values resulting from the first subset of emitters, contains sufficient information to allow step 506 to identify the number of touches. In a variant, the touch analysis step 506 is preceded by a further activation step (not shown), in which a second subset of emitters are activated to supplement the information from the first subset of emitters, to facilitate/enable step 506.

Typically, the mixed mode involves activating (step 507) a further subset of emitters to enable collection of sufficient data for the subsequent touch determination (step 505). As indicated in FIG. 8, the supplementary activation step 507 may involve activating a geometrically tailored subset, which means that emitters are selectively activated to achieve a high accuracy at the locations of the touching objects, and a reduced/undefined accuracy in regions where no touches are present. The accuracy is typically given by the number of intersecting scanlines. Thus, emitters are activated to obtain a desired density of scanlines at specific locations on the touch surface. These specific locations may be determined based on touch locations determined in step 506 in the current frame and/or touch locations computed by the touch determination step 505 in one or more preceding frames.

Typically, the number of activated emitters in the mixed mode is less than the full set of emitters activated in the normal mode. Like in the idle and signature modes, the frame rate may be changed compared to the normal mode. For example, the frame rate may be increased in the mixed mode while maintaining approximately the same signal-to-noise ratio as in the normal mode. In one embodiment, the frame rate is continually adjusted in accordance with the time needed for data collection and touch determination in the mixed mode.

In all of the above embodiments and examples, a time delay may be introduced to delay a mode change until several frames or seconds have elapsed since the touch identification step 502 or the touch analysis step 506 first identifies the fulfillment of a condition for switching from one mode to another. For example, double taps may need to be detected with high accuracy. Therefore, the touch identification step 502 (FIGS. 5-8) may be configured with a time delay for switching to idle mode, whenever absence of touching objects on the touch surface is identified. The time delay may be set to exceed the expected time between touches in a double tap. The time delay may be set at construction of the system, set by user preference or determined by the mode selector. In another example, the touch identification step 502 (FIGS. 5-8) may be configured with a time delay for switching from idle mode, whenever presence of a touching object is identified. Such a time delay may be advantageous to prevent the system from inadvertently leaving idle mode due to signal noise.

As indicated in the foregoing examples, a reduced number of active emitters in the illumination arrangement may be used in the idle mode, and the control unit 6 may cause the number of active emitters 2 to be reduced. If the control unit 6 detects that something has happened on the touch surface, it may select another mode that tailors the emission pattern according to the touch or touches on the surface.

As indicated in the foregoing examples, the mode selector 7 may be configured to determine geometrical positions of touches on the touch surface, if present, and to select a mode for the emission pattern in accordance with the geometrical positions of the touches. As used herein, "geometrical position" is intended to denote a position given by coordinates in a coordinate system associated with the touch surface. Thus, by knowing the geometrical positions of touches it is possible to tailor the emission pattern of the light from the emitters 2 to accurately cover/illuminate the geometrical positions, advantageously within the same frame. This enables a reduced energy consumption of the system, but with a still accurate detection where the touches are present.

As indicated in the foregoing examples, if a single geometrical position is detected on the touch surface, the mode selector 7 may be configured to select signature mode, whereby the control unit 6 may be configured to control the emitters 2 in the illumination arrangement 3 to accurately cover the single geometrical position by using a tailored subset of the emitters 2. To accurately cover a geometrical position means that the number of scanlines is high enough to ensure detection of a touch in that position.

As indicated in the foregoing examples, if a plurality of geometrical touch positions are detected, the mode selector 7 may be configured to select normal mode, whereby the control unit 6 is configured to control the emitters 2 to accurately cover the total touch surface by using all available emitters 2.

Figure 9:
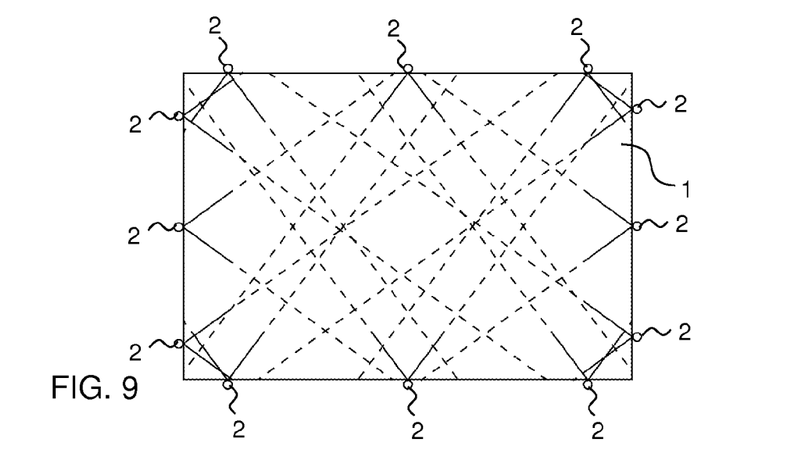
FIG. 9 illustrates twelve (12) chosen emitters from all sides that emit light in a touch-sensitive system according to one embodiment of the invention.

As indicated in the foregoing examples, the mode selector 7 may be configured to select a mixed mode when a limited number of geometrical touch positions are detected on the touch surface, whereby the control unit 6 is configured to control the emitters 2 in the illumination arrangement to accurately cover the limited number of geometrical touch positions by using a tailored subset of the emitters 2. Mixed mode may be defined as a mode chosen along a "continuous" scale between normal and signature mode depending on where and how many touches are being detected on the touch surface. The tailored subset of emitters may be activated to replace or supplement the first subset of emitters activated at the start of the frame. An example of an emission pattern in signature mode or mixed mode is illustrated in FIG. 9, in which twelve selected emitters arranged along all sides of the panel 1 are activated to emit light. For example, light may be emitted such that every position on the touch surface is covered by at least two scanlines that are not too close to parallel. Thus, it is possible to tailor the emitters 2 to emit light in a desired emission pattern within preferably the same frame. Several geometrical positions can then be covered; meanwhile the system is consuming less energy.

Within the context of the present disclosure, there are many different ways of designing the tailored subset of emitters. In one embodiment, the control unit 6 is configured to analyze the geometrical positions of the touches in relation to the current set of scanlines (i.e. the scanlines of the currently activated emitters), and selectively activate one or more emitters that define further scanlines at the known geometrical positions, so as to obtain a current set of scanlines that results in the desired performance. In another embodiment, the touch surface is subdivided into predefined subareas, with each subarea being associated with a specific group of emitters, wherein activation of the group is known to provide adequate illumination of the subarea. Thus, the control unit 6 may be configured to analyze the geometrical positions of the touches to identify one or more subareas, and selectively activate one or more groups of emitters based on the thus-identified subareas. In both of the above examples, the emitters may be activated to achieve, e.g., a certain number of intersecting scanlines at each geometrical position, and/or a certain angle between intersecting scanlines. In yet another embodiment, the tailored set of emitters is designed based on the number of touches only, e.g. by the control unit 6 being configured to activate a given number of emitters as a function of the number of touches. For example, two touches may result in a fourth of the available emitters being activated, and three touches may result in a third of the available emitters being activated, etc. Suitably, each such set of emitters is designed to generate a uniform grid of scanlines across the touch surface, such that the density of scanlines is caused to increase with increasing number of touches.

As indicated in the foregoing examples, the control unit 6 may be configured to change the emission pattern within the same frame as the touch is detected, to allow touch detection with high accuracy within the same frame. Thus, to select a mode, an analysis of the touches is first made after activating a first subset of the emitters. After a mode has been selected and an appropriate set of emitters has been activated, a touch determination may be made using the light transmitted along the scanlines from the set of emitters. Thereby, a touch determination can be made with high accuracy.

As indicated in the foregoing examples, the mode selector 7 may be configured to identify if an object touches the touch surface on the panel, specifically for determining when to switch to and from the idle mode based on the first ensemble of energy values obtained from the first subset of emitters. The mode selector 7 is according to one embodiment configured to identify objects by monitoring the temporal behavior of the energy values, or transmission values if computed. Specifically, the mode selector 7 is configured to obtain a reference signal $d_{ri}$ for each scanline $S_i$ and compare the current energy or transmission value $d_{ti}$, $T_i$ to this reference signal. The reference signal $d_{ri}$ may be determined to represent the "history" of the respective current energy/transmission value for a scanline, i.e. some kind of average representation of a set of preceding energy/transmission values for the scanline. For example, the reference signal $d_{ri}$ may be determined by filtering a sequence of energy/transmission values detected for a specific scanline during preceding frames. The filter used may for example be of the type low-pass or band-pass. Alternatively, a high-pass filter may be used, with the reference signal being represented by the difference between the input and output of the filter. In other alternatives, a time-windowed average function, an exponential forget function or an integrating function may be used to determine the reference signal. Below, two examples of algorithms are illustrated in further detail. Other methods may also be conceivable, which have the ability to detect a fast temporal change in the energy/transmission values obtained for the different scanlines To compute the reference signal $d_{ri}$ using a time-windowed average function, the following equation may be used:

$$d_{ri} = \frac{1}{k} \sum_{n=(N-k-1),N} d_{ni} \qquad (2)$$

where k is the number of frames in the averaging window, $d_{ni}$ is the detected energy value for scanline i for frame n, and N is the end of the averaging window. It is also possible to use a temporal gap between the current frame and the end of the averaging window, causing the reference signal to be less dependent on the most recent temporal behavior of the energy values. The number of frames, k, used for the window average is generally in the region 5-1000. The possible gap, N, is generally less than 100 frames.

The reference signal $d_{ri}$ in the exponential forget method can be computed as:

$$d_{ri} = (1-\epsilon)+d_{ri}+\epsilon \cdot d_{ti} \qquad (3)$$

where the parameter $\epsilon$ is chosen in accordance with the temporal behavior of the system, and is relatively close to 0, e.g. less than 0.01 and larger than 0.000001. The parameter $d_{ti}$ indicates the detected energy value for scanline $S_i$ in the current frame. Equation (3) is similar to the time-windowed average except that the newest energy values have a higher impact than older ones. Also, there is no need to keep track of as many values. In the two examples above, the raw signal values $d_{ti}$ are processed, but it is essentially the same as processing the transmission values $T_i$.

The mode selector 7 is according to one embodiment configured to detect changes in the energy/transmission values by computing a norm ($\| \ \|$) using the reference signals and the current signal values, either transmission or raw, for all relevant scanlines in the light detection arrangement, and use the value of the norm to determine if an object is touching the touch surface. The norm may for instance be of order 1, 2, or infinity, and the norm may be computed by taking the difference or ratio of the current signal values and the reference signals. Accordingly, a way to distinguish between different modes is achieved, to be able to tailor the emission pattern. If the norm is below a threshold value, idle mode is selected, otherwise one of the other modes is selected.

Below, examples of the above-mentioned evaluation criteria are given:

$$\|d_t - d_r\|_1 < q \qquad (5)$$

$$\|d_t - d_r\|_2 < q$$

$$\|d_t - d_r\|_\infty < q$$

$$\left\|\frac{1-d_t}{d_r}\right\|_1 < q$$

$$\left\|\frac{1-d_t}{d_r}\right\|_2 < q$$

$$\left\|\frac{1-d_t}{d_r}\right\|_\infty < q$$

where the threshold value, q, has to be set in accordance with how much touch interaction the particular system has. The threshold value should in general be set low enough to react on weak touches, which may occur e.g. when a user drags a finger lightly across the touch surface and which might correspond to a change of transmission value of around, or slightly below, 0.1%. In general, the threshold value should correspond to a transmission change somewhere in the range between 0.01% and 5%.

The mode selector 7 is according to another embodiment configured to use correlation values between the reference signal and the current signal values, and use the correlation value to determine if touches are present on the touch surface. If the correlation value drops below a certain threshold value, the idle mode is chosen.

As indicated in the foregoing examples, the choice between normal and signature mode (or to design a tailored set of emitters in mixed mode) can be done by analyzing the touch locations determined based on the ensemble of energy values obtained from the detectors when activating the first subset of emitters, and optionally when activating a small extra set of emitters. By counting the number of touches, and possibly also analyzing their geometrical positions, a switch of mode can be decided, e.g. a switch into signature mode if there is only one touch present, into normal mode if there are several touches present, or mixed mode if there is a limited number of touches.

In a variant, the switching between modes may be decided based on geometrical positions only. For example, the mode selector may be configured to switch into signature/mixed mode whenever a certain number of touches are identified within one or more specific touch areas on the touch surface. Such a touch area may be either static, i.e. predefined for the system, or dynamic, i.e. associated with areas temporarily generated on a dynamic GUI.

The geometrical position of a touch on the touch surface is according to one embodiment determined by reconstructing an attenuation map of the touch surface, i.e. the touch locations are determined based on the set of transmission values $T_i$. Such an attenuation map may be reconstructed using known algorithms developed for transmission tomography with a parallel scanning geometry or fan beam geometry depending on the actual optical design of the system. In essence, the touch locations may be reconstructed using any available image reconstruction algorithm. If there is a limited set of scanlines, it may be beneficial to use specially designed few-view algorithms.

Figure 10:
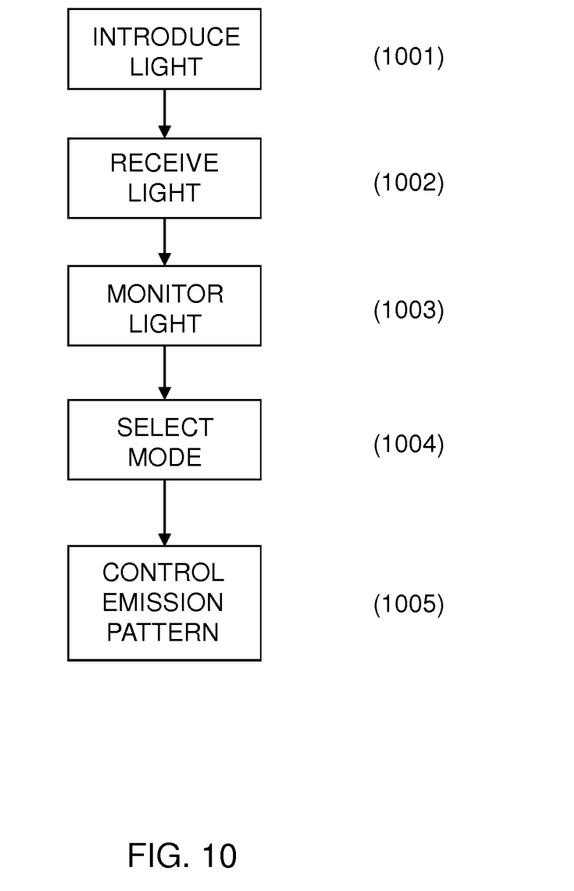
FIG. 10 is a flowchart of an embodiment of the invention.

The exemplifying embodiments discussed in relation to FIGS. 5-8, could be generalized to a control method which will now be described with reference to the flowchart in FIG. 10. The control method is operated to control the emission pattern in a touch-sensitive system comprising a light transmissive panel 1. In step 1001, light is introduced into the panel with an illumination arrangement 3 comprising emitters 2. In step 1002, the light propagating in the panel 1 is received by a light detection arrangement 5 comprising detectors 4. In step 1003, the received light is monitored to detect touches on the touch surface which thereby attenuates the light propagating in the panel 1. Then, in step 1004, a mode is selected for the emission pattern in dependence of the occurrence of touches on the touch surface. Finally, in step 1005, the emission pattern is controlled in accordance with the selected mode. Thus, the emission pattern may be adapted for the detected occurrence of touches on the touch surface to reduce the energy consumption but still determining touch locations with high accuracy and/or with low latency between frames.

According to one embodiment, only a subset of the available emitters 2 are active and monitored when the mode is selected. Thus, the mode selection may be based on signals from a reduced number of active emitters. Accordingly less energy is used since light is emitted from only a subset of the emitters ("the first subset"), before the mode selection step 1004 determines which mode to select to get sufficient accuracy of the touch determination, i.e. the positions on the touch surface where touches are present, while possibly further reducing the energy consumption. The method comprises according to one embodiment controlling the emission pattern by changing the number of active emitters 2, and/or changing the intensity/energy of the emitted light from the active emitters 2, and/or controlling the frame rate, the frame rate being how often data from all relevant detectors 4 and emitters 2 are collected and touch coordinates are computed. Thus, it is possible to tailor a subset of emitters according to the appearance of touches on the touch surface.

Different modes are thus selected by the mode selection step 1004 according to the activity on the touch surface. For example, by counting the number of touches on the touch surface, a mode for the emission pattern may be selected in accordance with the number of touches. In addition, the method may comprise determining geometrical positions of touches on the screen surface, and selecting a mode for the emission pattern in accordance with the geometrical positions of the touches. Thus, a mode can be selected in dependence of the number of touches and also their geometrical positions.

According to a further aspect of the invention, a computer-readable medium is provided for storing processing instructions that, when executed by a data processor (8 in FIG. 1), performs the method as described above.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A touch-sensitive system comprising:
a light transmissive panel defining a touch surface and an opposite surface;
an illumination arrangement including emitters configured to introduce light into the panel for propagation in the panel in an emission pattern;
a light detection arrangement including detectors configured to receive the light propagating in the panel; and
a control unit for controlling the illumination arrangement, wherein the control unit includes a mode selector configured to,
monitor the light received in the light detection arrangement to detect one or more touches on the touch surface, said one or more touches attenuating the light propagating in the panel, and
select a mode for the emission pattern in dependence of the occurrence of touches on the touch surface,
wherein the control unit is configured to control the emission pattern in accordance with the selected mode, and
wherein the control unit is configured to control the emission pattern by changing at least one of the number of active emitters in the illumination arrangement and the intensity of the light emitted by the emitters.

2. The touch-sensitive system according to claim 1, wherein the control unit is further configured to control the frame rate, the frame rate being the frequency by which data from all relevant detectors and emitters are collected and touch coordinates are computed.

3. The touch-sensitive system according to claim 1, wherein the mode selector is configured to count the number of touches on the touch surface, and to select a mode for the emission pattern in accordance with the number of touches.

4. The touch-sensitive system according to claim 1, wherein the mode selector is configured to determine geometrical position of touches on the touch surface and to select a mode for the emission pattern in accordance with the geometrical position of the touches.

5. The touch-sensitive system according to claim 4, wherein the mode selector is configured to select a signature mode when a single geometrical touch position is detected on the touch surface, and wherein the control unit is configured to control the emitters in the illumination arrangement to accurately cover said single geometrical touch position by activating a tailored subset of the emitters.

6. The touch-sensitive system according to claim 4, wherein the mode selector is configured to select a normal mode when the number of determined geometrical touch positions exceeds a number limit, and wherein the control unit is configured to control the emitters to accurately cover the total touch surface by activating all available emitters.

7. The touch-sensitive system according to claim 6, wherein the mode selector is configured to select a mixed mode when the number of determined geometrical touch positions is more than 1 but less than said number limit, and wherein the control unit is configured to control the emitters in the illumination arrangement to accurately cover the number of determined geometrical touch positions by activating a tailored subset of the emitters.

8. The touch-sensitive system according to claim 1, wherein the control unit, after detecting one or more touches in one frame, is configured to change the emission pattern within the same frame to allow computation of touch coordinates within the same frame, a frame being a period of time in which data from all relevant pairs of emitters and detectors are collected and touch coordinates are computed.

9. The touch-sensitive system according to claim 1, wherein the control unit is configured to operate in a sequence of frames, wherein the control unit is configured to, within each frame, activate a subset of the emitters, and wherein the mode selector, within each frame, is configured to select a mode based on the monitored light received by the light detection arrangement from the subset.

10. The touch-sensitive system according to claim 9, wherein the mode selector is configured to select an idle mode, if absence of touches on the touch surface is detected based on the monitored light received by the light detection arrangement from the subset.

11. The touch-sensitive system according to claim 10, wherein the control unit is configured to, for each frame, activate only the subset during the idle mode.

12. The touch-sensitive system according to claim 9, wherein the mode selector is configured to select a normal mode, if presence of touches on the touch surface is detected based on the monitored light received by the light detection arrangement from the subset, wherein the control unit is configured to activate all emitters during the normal mode.

13. The touch-sensitive system according to claim 9, wherein the control unit is configured to determine the number of touches on the touch surface based on the monitored light received by the light detection arrangement from the subset, and wherein the mode selector is configured to select a mode based on the number of touches.

14. The touch-sensitive system according to claim 13, wherein the control unit is configured to determine the geometrical position of touches on the touch surface based on the monitored light received by the light detection arrangement from the subset, and to determine the emission pattern based on the geometrical position of touches.

15. The touch-sensitive system according to claim 1, wherein the mode selector is configured to detect touches on the touch surface by analyzing the temporal behavior of signals representative of the received energy on a plurality of light paths between activated emitters and the detectors.

16. The touch-sensitive system according to claim 15, wherein the mode selector is configured to analyze the temporal behavior by comparing said signals representative of the received energy on the plurality of light paths to reference signals, wherein each reference signal is obtained as an average representation of previously received energy on the respective light path.

17. The touch-sensitive system according to claim 1, wherein the control unit is configured to compute touch coordinates representing a geometrical position of the touches on the touch surface by reconstructing an attenuation map of the touch surface, based on signals representative of the light transmission on a plurality of light paths between activated emitters and the detectors, the control unit being configured to form the signals by dividing a measured energy value for each light path by a background value that represents a measured energy for the light path without touches on the touch surface.

18. A method for controlling a touch-sensitive system including a light transmissive panel defining a touch surface and an opposite surface, the method comprising:
 introducing light into the panel with an illumination arrangement including emitters, for propagating in the panel in an emission pattern;
 receiving the light propagating in the panel with a light detection arrangement including detectors;
 monitoring the light received by the light detection arrangement to detect one or more touches on the touch surface, said one or more touches attenuating the light propagating in the panel;
 selecting a mode for the emission pattern in dependence of the occurrence of touches on the touch surface;
 controlling the emission pattern in accordance with the selected mode; and
 wherein the emission pattern is controlled by changing at least one of the number of active emitters in the illumination arrangement and the intensity of the light emitted by the emitters.

19. The method according to claim 18, which operates in a sequence of frames, each frame including activating a subset of the emitters, and selecting a mode based on the monitored light received by the light detection arrangement from the subset.

20. A non-transitory computer-readable medium storing processing instructions that, when executed by a data processor, cause the data processor to perform a method for controlling a touch-sensitive system including a light transmissive panel defining a touch surface and an opposite surface, the method comprising:
 introducing light into the panel with an illumination arrangement including emitters, for propagating in the panel in an emission pattern;
 receiving the light propagating in the panel with a light detection arrangement including detectors;
 monitoring the light received by the light detection arrangement to detect one or more touches on the touch surface said one or more touches attenuating the light propagating in the panel;
 selecting a mode for the emission pattern in dependence of the occurrence of touches on the touch surface;
 controlling the emission pattern in accordance with the selected mode; and
 wherein the emission pattern is controlled by changing at least one of the number of active emitters in the illumination arrangement and the intensity of the light emitted by the emitters.

* * * * *